United States Patent [19]

Sampietro et al.

[11] Patent Number: 4,879,617
[45] Date of Patent: Nov. 7, 1989

[54] ACTUATOR ASSEMBLY FOR HARD DISK DRIVES

[75] Inventors: Joseph M. Sampietro, Tarzana; Khosrow Mohajerani, Newbury Park, both of Calif.

[73] Assignee: Rigidyne Corporation, Simi Valley, Calif.

[21] Appl. No.: 173,618

[22] Filed: Mar. 25, 1988

[51] Int. Cl.$^4$ ............................................... G11B 5/55
[52] U.S. Cl. .................................................... 360/106
[58] Field of Search ................................. 360/106, 104

[56] References Cited

U.S. PATENT DOCUMENTS 4,544,972 10/1985 Kogure ............................... 360/106
4,775,908 10/1988 Yeas ..................................... 360/106

Primary Examiner—A. J. Heinz
Attorney, Agent, or Firm—Kelly, Bauersfeld & Lowry

[57] ABSTRACT

An actuator assembly for a disk drive system includes an actuator pivotally mounted to a shaft, and a coil assembly. A counterbalance portion of the actuator provides a recess wherein a portion of the coil assembly is slidably inserted. The coil assembly includes a bobbin which has a dovetail portion having at least two precision positioning surfaces which, when placed within the counterbalance recess, interact with corresponding precision positioning surfaces provided within the counterbalance recess. In order to accurately position the coil assembly with respect to the actuator, an outward force is applied to the coil assembly perpendicular to the pivot axis to cause facing pairs of the precision positioning surfaces of the coil assembly and the counterbalance recess to bear against one another, and align a dowel/pin alignment passageway extending through the counterbalance with a dowel/pin recess provided in the bobbin. A dowel is then placed through the alignment passageway and into the dowel/pin recess to hold the actuator and coil assembly in the preferred configuration while an adhesive is injected into the spacing between the bobbin and the counterbalance recess. No adhesive is injected between the precision positioning surfaces bearing against one another. The dowel is subsequently removed and replaced by a stop pin.

23 Claims, 2 Drawing Sheets

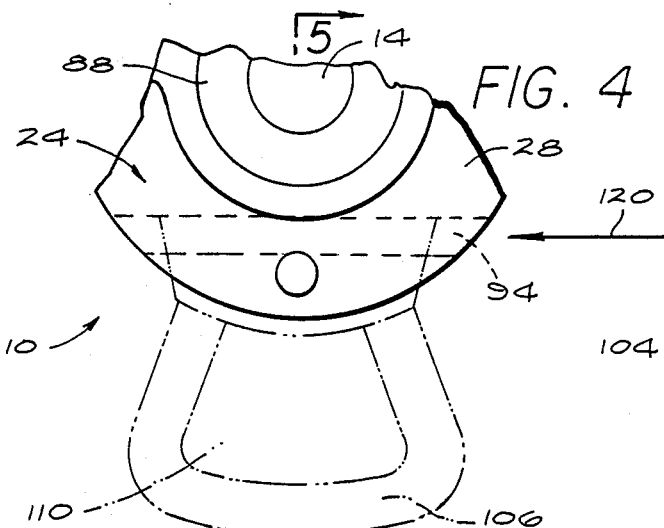
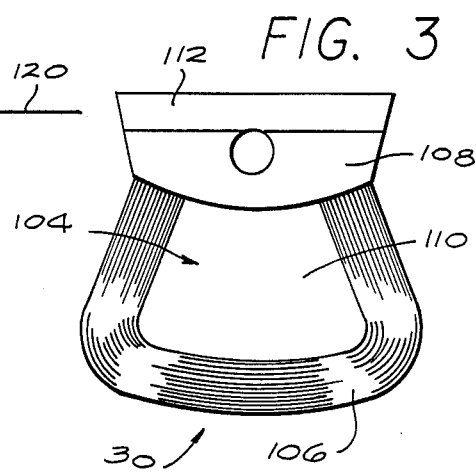
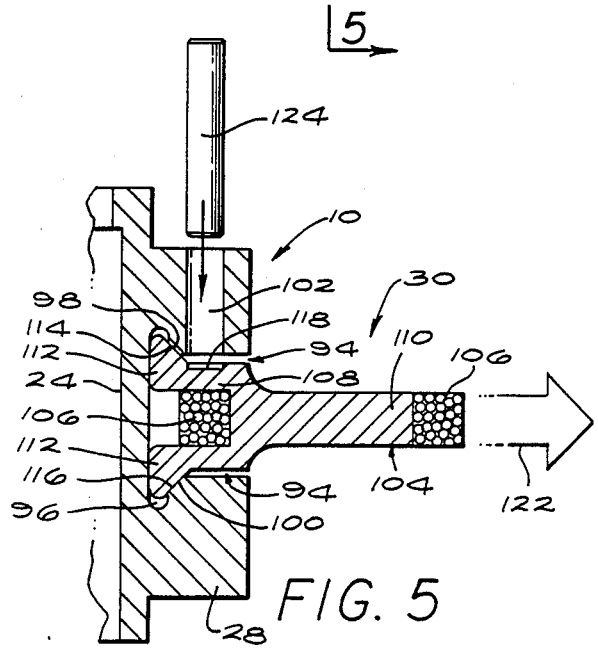
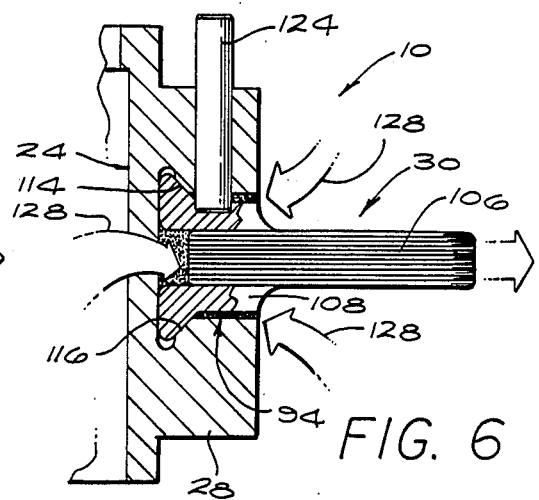
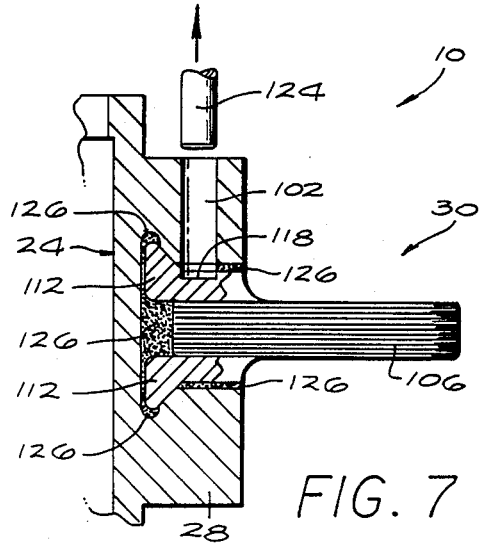
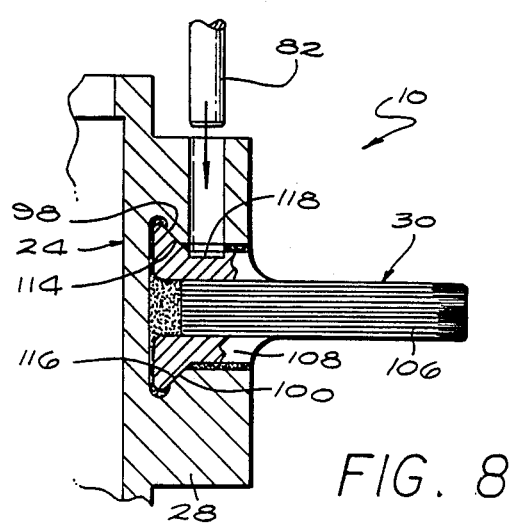

ACTUATOR ASSEMBLY FOR HARD DISK DRIVES

BACKGROUND OF THE INVENTION

This invention relates generally to improvements in the fabrication of actuator assemblies for use in computer disk drives. More particularly, this invention relates to an improved actuator assembly and method for attaching a coil assembly to an actuator in a manner which economically and reliably assures proper alignment of the coil assembly.

In recent years, microcomputer equipment, particularly the so-called personal and desk top computers, have become extremely popular for a wide variety of business, educational and other uses. Such computers commonly include a main central processor unit having one or more memory storage disks for storage of data. In many modern computers the storage disk or disks sometimes referred to as "hard disks," are provided as part of a Winchester-type disk drive unit having the storage disks supported in a stack on a rotary spindle within a substantially sealed disk drive housing. The disks are rotatably driven in unison by a small spindle motor, and one or more electromagnetic heads on a movable actuator are displaced by a moving coil, limited rotation D.C. motor to traverse surfaces of the rotating disks for purposes of reading and writing data. Such Winchester-type disk drive units are generally preferred in comparison with so-called floppy-type disk drives due their higher memory storage capacities and faster operating speeds.

The actuator used in Winchester-type disk drive units resembles the traversing arm of a common phonograph, and is pivotally mounted about a shaft adjacent an edge of the stacked storage disks. Such actuators typically include an arm assembly designed to carry the electromagnetic heads which are used to read and write data on the disk stack, and a counterbalance situated opposite the arm assembly with respect to the pivot shaft.

A coil is mounted to the counterbalance portion of the actuator to interact with a magnet assembly, for purposes of controlling the movement and positioning of the electromagnetic heads. As a current moves through the coil, it reacts with the magnet assembly to move the entire actuator assembly, comprising the actuator and the coil. Since precision control of the armature is necessary for proper operation of the disk drive unit, accurate positioning of the coil with respect to the actuator is critical to satisfactory performance.

The need for precision components in disk drive units often conflicts with the desire by manufacturers to produce products in an efficient and reliable manner. For example, in order to manufacture actuator assemblies to proper specifications and tolerances, the actuator and the coil assembly are typically fabricated separately and then attached to one another prior to installation into the disk drive unit. The precision relationship between the actuator and the coil assembly has previously required, however, an unacceptable degree of manual-type work during the assembly process. This has resulted in reduced economy of manufacture, higher costs and less than desirable levels of unit reproducibility.

Accordingly, there has been a need for an improved actuator assembly and method for attaching a coil assembly to an actuator in a manner which economically and reliably assures proper alignment of the two elements prior to installation into a disk drive unit. Such an improved actuator assembly should include components easily attached to one another, and which can be properly aligned quickly, locked into position and secured together utilizing a minimal number of steps. Further an improved actuator assembly and related method of fabrication is needed which minimizes the possibility of human-introduced error during the assembly process which could result in misalignment of the coil with respect to the actuator. Moreover, such an improved actuator assembly must be capable of prolonged, reliable use, and accommodate additional elements incorporated into disk drive units. The present invention fulfills these needs and provides other related advantages.

SUMMARY OF THE INVENTION

The present invention resides in an improved actuator assembly for a disk drive system which is designed for manufacturability and reproducibility. In accordance with the invention, the actuator assembly includes an actuator which can be pivotally mounted to a shaft, and a coil assembly. A counterbalance portion of the actuator provides a recess into which a portion of the coil assembly is slidably inserted. Both the actuator and the coil assembly are provided precision positioning surfaces which bear against one anther to accurately position the coil assembly with respect to the actuator. The arrangement of parts, and the method of assembly as set forth herein, speeds the assembly process while reducing the human error factor which can result in production of an unacceptable product.

In a preferred form of the invention, the actuator includes an arm assembly extending outwardly from the pivot axis oppositely from the counterbalance. The arm assembly includes a plurality of head carriers for supporting head assemblies which interact with the disks for the storage and retrieval of information. The actuator further includes a latch pin fixed to a latch pin arm which extends outwardly from the pivot axis of the actuator between the arm assembly and the counterbalance. The latch pin is positioned for locking reception by locking means of the disk drive system to immobilize the actuator assembly. The recess for the coil assembly in the counterbalance is situated generally opposite the arm assembly and extends perpendicular to the pivot axis. This counterbalance recess includes a dovetail receiving portion having at least two precision positioning surfaces. The counterbalance further includes a dowel/pin alignment passageway which extends generally parallel to the pivot axis.

The coil assembly includes a bobbin which supports winding means. The bobbin includes a base, a flange-like core which extends outwardly from the base to support the winding means, and a dovetail extending from the base opposite the core. The winding means extends peripherally about the bobbin core through the base. The dovetail is dimensioned to fit within the dovetail receiving portion of the counterbalance recess, and includes at least two precision positioning surfaces. The base of the bobbin further includes a dowel/pin recess which aligns with the dowel/pin alignment passageway of the counterbalance when the coil assembly is correctly positioned therein.

In assembling the coil assembly to the actuator, the base and dovetail portions of the coil assembly are caused to slide into the counterbalance recess. An outward force is then applied to the coil assembly perpendicular to the actuator pivot axis to cause the precision positioning surfaces of the bobbin dovetail to engage corresponding precision positioning surfaces of the counterbalance recess dovetail receiving portion. The counterbalance recess is dimensioned to permit assembly of the coil assembly to the actuator without engaging the corresponding precision positioning surfaces of the actuator and the bobbin until a force is applied to pull the coil assembly away from the actuator perpendicularly with respect to the pivot axis.

The precision positioning surfaces of the counterbalance dovetail receiving portion include an upper planar surface extending generally the length of the recess, and a lower planar surface spaced from the upper planar surface. The lower planar surface also extends generally the length of the recess. These upper and lower planar surfaces are inclined opposite to one another with respect to the actuator pivot axis and the direction of force applied to the coil assembly, so that upon application of the outward force to the coil assembly the upper and lower planar surfaces tend to centrally position the coil assembly within the counterbalance recess so that the bobbin core extends perpendicularly away from the pivot axis of the actuator. Moreover, the precision positioning surfaces of the bobbin dovetail include corresponding planar surfaces dimensioned to bear against the facing upper and lower planar surfaces of the counterbalance dovetail receiving portion when the outward force is applied to the coil assembly.

A dowel is inserted through the alignment passageway of the counterbalance to position an end thereof in the bobbin dowel/pin recess, while the outward force is applied to the coil assembly. Causing the corresponding precision positioning surfaces of the bobbin and the counterbalance to bear against one another, and then inserting a dowel through the alignment passageway into the dowel/pin recess of the bobbin, insures that the coil assembly is properly positioned with respect to the actuator. The dowel locks the coil assembly in its proper position, which then can be cemented in place to the actuator.

Although with the dowel in place the coil assembly is fixed to the actuator so that upon removal of the outward force on the coil assembly the precision positioning surfaces remain engaged, it is preferred that this outward force be maintained until the coil assembly is firmly cemented or fixed to the actuator. Fixing the coil assembly to the actuator is accomplished by injecting an adhesive into the counterbalance recess between the actuator and the bobbin. In the preferred method, the corresponding precision positioning surfaces remain engaged throughout the injection of adhesive such that no adhesive is ejected therebetween.

After the adhesive has cured, the dowel is removed and replaced with an actuator position stop pin. The actuator assembly is then preferably mounted to the shaft, which in turn is mounted within a disk drive housing. The housing includes a stop plate for limiting movement of the position stop pin, thereby defining the range of movement of the actuator and head assemblies.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings:

FIG. 3 is a top plan view of the coil assembly illustrated in FIGS. 1 and 2;

FIG. 4 is a fragmented top plan view of the counterbalance portion of the actuator, which, together with FIG. 3, illustrates the manner in which the coil assembly is slidably received within a counterbalance recess as one of the initial steps in the assembly process;

FIG. 5 is a fragmented elevational section taken generally along the line 5—5 of FIG. 4, illustrating another step in the assembly process which includes the application of an outward force to the coil assembly to place precision positioning surfaces of both the counterbalance recess and the bobbin in direct contact, and to align a dowel/pin alignment passageway with a dowel/pin recess to permit insertion of dowel therethrough;

FIG. 6 is a view similar to FIG. 5, illustrating the injection of an adhesive into the counterbalance recess between the actuator and the bobbin after the dowel is in place and while the outward force is applied, such that no adhesive is injected between the precision positioning surfaces;

FIG. 7 is another elevational section similar to FIGS. 5 and 6, illustrating the assembly step of removing the dowel after the injected adhesive has been allowed to set up; and FIG. 8 is an elevational section similar to FIGS. 5 through 7, illustrating the assembly step of replacing the dowel with a position stop pin.

DETAILED DESCRIPTION OF THE PREFERRED EMBODIMENT

Figure 1:
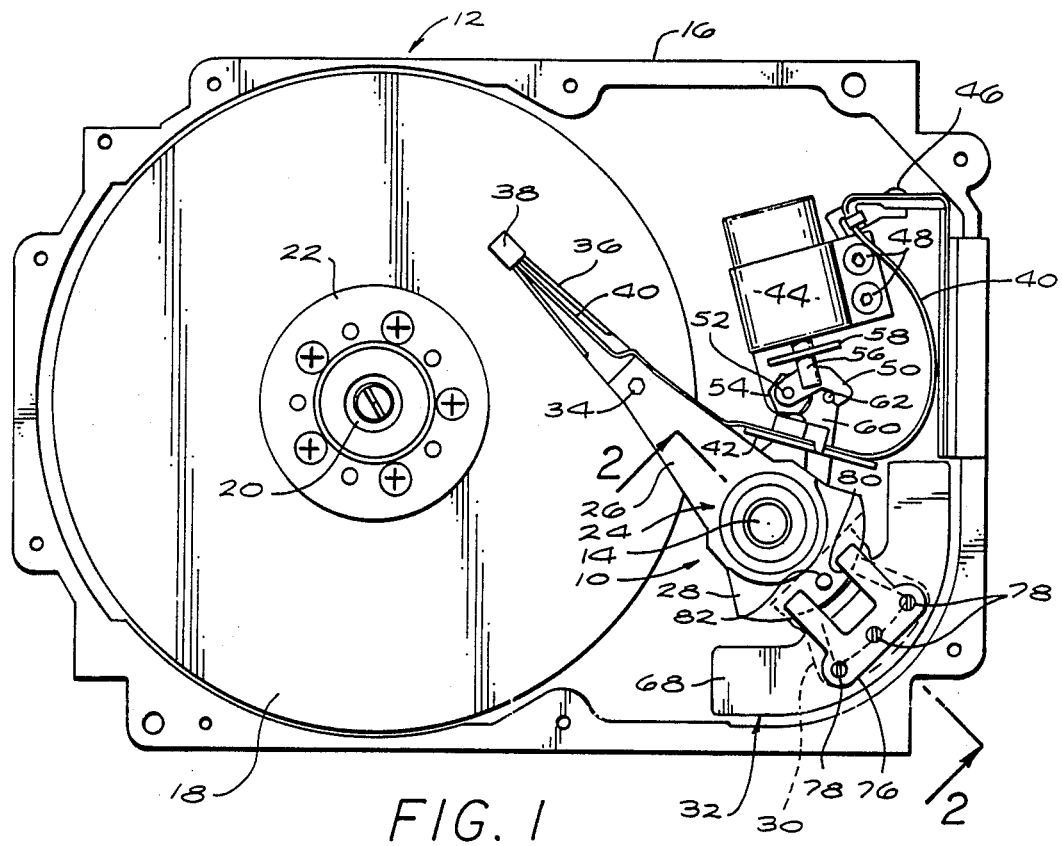
FIG. 1 is a top plan view of a hard disk drive unit, shown with the top cover removed and illustrating the operational relationship between an actuator assembly and a stack of disks.

As shown in the drawings for purposes of illustration, the present invention is concerned with an improved actuator assembly, generally designated in the accompanying drawings by the reference number 10. The improved actuator assembly 10 is useful in hard disk drive systems, such as the exemplary system 12 somewhat schematically shown in FIG. 1. As will become apparent below, the actuator assembly 10 includes components which are capable of being quickly assembled into a precision relationship. This tends to enhance manufacturing economy of the actuator assembly 10, and reduce human-introduced errors or defects.

As illustrated with respect to a preferred embodiment in FIG. 1, the actuator assembly 10 is pivotally mounted to a pivot shaft 14 within a casing 16 adjacent to a stack of storage disks 18. These disks 18 are clamped onto a shaft 20 of a spindle motor (not shown) by a spacer bushing 22, with the disks being oriented in the stack more or less uniformly spaced from one another. The bushing 22 is, of course, rotatable with the disks 18 and the shaft 20 of a spindle motor which drives the stack of storage disks in unison.

The actuator assembly 10 comprises, broadly, an actuator 24 having an arm assembly 26 which extends toward the stack of storage disks 18, and a counterbalance portion 28 situated opposite the arm assembly with respect to the pivot shaft 14. A coil assembly 30 is fixed to the counterbalance 28 of the actuator 24, and interacts with a magnet assembly 32 to form a precision moving coil, limited rotation D.C. motor which angularly displaces the actuator assembly 10 about the pivot shaft 14. The arm assembly 26 includes a plurality of head carriers 34 which each support a head assembly 36. These head assemblies, in turn, support electromagnetic heads 38 which are capable of reading and writing data on the respective storage disks 18 as the heads traverse the disks in response to movement of the actuator assembly 10.

A data cable 40 extends from the electromagnetic heads 38 along the respective head assemblies 36 to the arm assembly 26. The data cable 40 is supported by a flexible cable clamp 42 which accommodates the limited movement of the cable 40 as the actuator assembly 10 is pivoted. The cable 40 extends from the flexible cable clamp 42 within the casing 16 around a solenoid 44 to a rigid cable clamp 46, and from there to an appropriate connection (not shown) for connecting the hard disk drive system 12 to appropriate computer hardware.

The solenoid 44 is mounted to the casing 16 by means of a pair of solenoid mounting bolts 48 in a manner whereby it controls the positioning of a pivotable latch pin locking lever 50. This locking lever 50 moves about a lever pivot 52 which is secured to a mounting nut 54. A solenoid actuating shaft 56, which includes a stop plate 58, is connected to the locking lever 50. This arrangement is provided for "parking" the actuator assembly 10, and thereby immobilizing the heads 38 when the disk drive system 12 is being moved.

The actuator 24 includes a latch pin arm 60 which extends outwardly from the pivot shaft 14 between the arm assembly 26 and the counterbalance 28. This arm 60 supports a latch pin 62 which can be captured by the locking lever 50. In normal operation of the hard disk drive system 12, the locking lever 50 is positioned by the solenoid 44 so as not to engage the latch pin 62, thereby allowing free movement of the electromagnetic heads 38 across the storage disks 18. When the solenoid 44 is not energized, however, the looking lever 50 is designed to automatically capture the latch pin 62 upon an impact of the latch pin against the locking lever. This is accomplished by providing a contour to the leading edge of the locking lever 50 which causes the desired movement of the lever upon impact to capture the latch pin 62.

Figure 2:
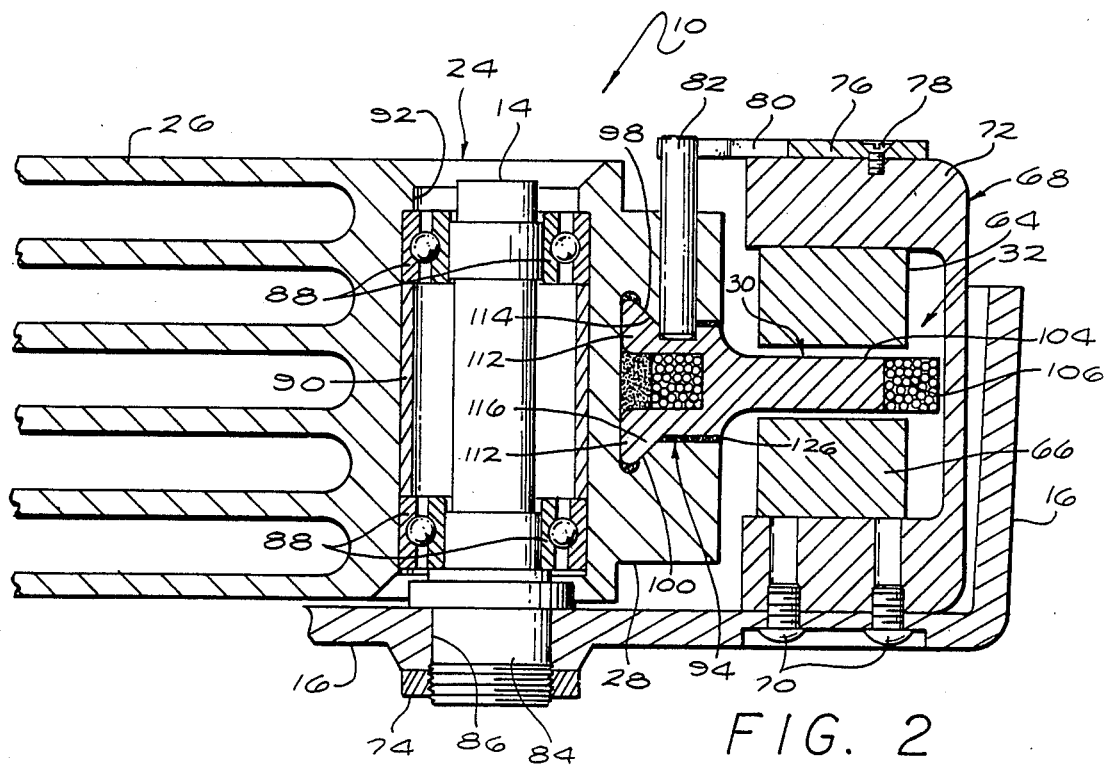
FIG. 2 is an enlarged fragmented elevational section taken generally along the line 2—2 of FIG. 1, illustrating the positioning of an actuator upon a shaft, and the assembly of a coil assembly to an actuator counterbalance to position a bobbin which carries windings within a magnet assembly.

The magnet assembly 32 interacts with the coil assembly 30 to control the positioning of the electromagnetic heads 38 with respect to the disks 18. As shown in FIGS. 1 and 2, the magnet assembly 32 includes a plurality of upper magnets 64 and lower magnets 66 spaced from one another so that the coil assembly 30 is permitted to extend therebetween. The magnets 64 and 66 are positioned upon a unitary magnet housing 68, which is secured to the casing 16 by housing mounting bolts 70.

A stop plate 76 is attached by three stop plate mounting bolts 78 to an upper portion 72 of the magnet housing 68. The stop plate 76 provides an elongated opening 80 through which an actuator position stop pin 82 extends. This stop pin 82 is mounted to the counterbalance portion 28 of the actuator 24 to move with movement of the actuator assembly 10. The stop plate 76 interacts with the position stop pin 82 to limit the total range of movement permitted the actuator assembly 10 about its pivot shaft 14.

In accordance with the present invention, and as shown best in FIG. 2, the pivot shaft 14 includes a threaded lower base 84 which is positioned within a hole 86 provided in the casing 16. A nut 74 is threaded onto the base 84 to hold the pivot shaft 14 securely on the casing 16. A pair of bearings 88 are positioned about the shaft 14, and are spaced from one another by a bearing spacer 90. The actuator 24 includes a shaft cavity 92 which receives the shaft 14, the bearings 88 and the bearing spacer 90. When assembled as illustrated in FIG. 2, the actuator 24 is permitted to freely pivot about the shaft 14 upon the bearings 88.

The counterbalance portion 28 of the actuator 24 includes a recess 94 situated generally opposite the arm assembly 26 and extending perpendicularly to the longitudinal axis of the shaft 14. This recess 94 includes a dovetail receiving portion 96 which defines two precision positioning surfaces 98 and 100. These precision positioning surfaces 98 and 100 comprise planar surfaces which are inclined opposite to one another, and for purposes of the present invention, must be accurately machined to precise tolerances to correctly positioning the coil assembly 30 within the counterbalance recess 94.

The counterbalance 28 further includes a dowel/pin alignment passageway 102 which extends from an upper surface of the counterbalance generally parallel to the pivot shaft 14, to the recess 94. The position stop pin 82 is positioned within this alignment passageway 102 when the actuator assembly 10 is ready for use. It will be seen, however, that this alignment passageway 102 can be used to help insure correct positioning of the coil assembly 30 with respect to the actuator 24.

As illustrated best in FIGS. 2 and 3, the coil assembly 30 includes a bobbin 104 which supports windings 106. The bobbin 104 includes a base 108, a flange-like core 110 which extends outwardly from the base to support the windings 106, and a dovetail 112 extending from the base opposite the core. The dovetail 112 is dimensioned to fit within the dovetail receiving portion 96 of the counterbalance recess 94, and includes two precision positioning surfaces 114 and 116, which correspond to and interact with the precision positioning surfaces 98 and 100, respectively, provided within the recess 94. The bobbin 104 can be manufactured of many different materials, such as brass, aluminum, glass filled plastic, or other resinous materials. It is presently preferred, however, that the bobbin 104 be constructed of aluminum.

The bobbin base 108 includes a dowel/pin recess 118 in an upper surface thereof. This recess is positioned to that it will be aligned with a lower end of the alignment passageway 102 when the bobbin precision positioning surfaces 114 and 116 are caused to bear against the counterbalance recess precision positioning surfaces 98 and 100. Further, in the assembled configuration of the actuator assembly 10, the lower end of the position stop pin 82 is positioned within this recess 118 (as shown in FIG. 2).

The windings 106 comprise bondable copper magnet wire, 34 AWG single film wire with adhesive coating. It is preferred that the single film is of the polyester type with a rated temperature of 180° C. or higher. The adhesive coating is preferably of the epoxy type with an operating temperature of 155° C. The windings 106 extend peripherally about the bobbin core 110 and through its base 108.

In the exemplary embodiment, the windings 106 comprise approximately 275 turns of the wire about the core 110, and the winding resistance is approximately 13.50 ohms. When the bobbin 104 is wound in a clockwise direction and the coil assembly 30 is placed within the magnet assembly 32, a positive voltage applied to the windings will cause the actuator assembly 10 to move toward the inner diameter of the stack of disks 18. Conversely, if a negative voltage is applied, the actuator moves to its retract position.

After the wire has been wound about the core 110, it is preferably heat bonded. Following this heat bonding of the windings 106, it is preferred that the coil temperature be allowed to come down before handling of the coil assembly 30, to avoid deformation of the same.

The preferred process for assembling the coil assembly 30 to the actuator 24 will now be described with reference to FIGS. 3 through 8. First, the coil assembly 30 is caused to slide into the counterbalance recess 94 in the direction indicated by the arrow 120 between FIGS. 3 and 4. Since the counterbalance recess 94 extends all the way through the counterbalance 28 of the actuator 24 it is important to be able to quickly and accurately position the base 108 and dovetail 112 of the bobbin 104 within the counterbalance recess 94, and then secure it in place.

To accomplish this, the dowel/pin recess 118 is aligned with the alignment passageway 102, and then an outward force is applied to the coil assembly 30 generally perpendicularly away from the pivot shaft 14. This causes the precision positioning surfaces 114 and 116 of the dovetail 112 to engage the precision positioning surfaces of the counterbalance recess 94. It should be noted here that the dovetail receiving portion 96 of the counterbalance recess 94 is dimensioned to permit the sliding of the coil assembly 30 through the counterbalance recess without engaging the precision positioning surfaces 98, 100, 114 and 116, until intended to do so through the application of the above-mentioned outward force. Such force is indicated by the arrow 122 in FIG. 5.

As briefly mentioned earlier, the precision positioning surfaces 98 and 100 within the dovetail receiving portion 96 of the counterbalance recess 94 are planar and inclined opposite to one another with respect to the pivot axis. These surfaces are further inclined opposite to one another with respect to the direction of force (as indicated by arrow 122) applied to the coil assembly 30. The corresponding precision positioning surfaces 114 and 116 of the bobbin 104 are likewise planar and inclined, to flatly bear against the corresponding precision positioning surfaces 98 and 100 of the counterbalance recess 94 when the outward force is applied to the coil assembly 30. The interaction of these surfaces tends to centrally position the coil assembly 30 within the counterbalance recess 94 so that the bobbin core 110 extends perpendicularly away from the pivot axis of the actuator 24.

When the corresponding precision positioning surfaces 98, 100, 114 and 116 are caused to bear against one another through application of the force indicated by the arrow 122, and the dowel/pin recess 118 is aligned directly below the alignment passageway 102, a dowel 124 is inserted through the alignment passageway to position an end thereof within the dowel/pin recess. This has the effect of securely and accurately positioning the coil assembly 30 in its desired configuration with respect to the actuator 24. When so positioned (see FIG. 6), the coil assembly 30 can then be fixed to the actuator 24 so that upon removal of the outward force as indicated by the arrow 122, the coil assembly 30 remains properly positioned within the counterbalance recess 94, with the precision positioning surfaces engaged.

More particularly, with the dowel 124 in place and the outward force indicated by the arrow 122 applied, an adhesive 126 is injected into the counterbalance recess 94 between the actuator 24 and the adjacent portions of the bobbin 104 and windings 106. Such injection of the adhesive 126 is schematically illustrated by the arrows 128 in FIG. 6. The outward force is preferably maintained on the coil assembly 30 throughout the application of the adhesive 126 to insure that the precision positioning surfaces 98, 100, 114 and 116 remain engaged, such that no adhesive is permitted to seep between corresponding pairs of the precision positioning surfaces. The adhesive is applied to the gaps between the bobbin 104 and the windings 106, and the adjacent portion of the actuator 24 so that any spacing between the actuator and coil assembly 30 is filled with the adhesive.

After the adhesive 126 has been allowed to cure and effectively secure the coil assembly 30 in its proper configuration with respect to the actuator 24, the dowel 124 is removed from the dowel/pin recess 118 and the alignment passageway 102 (see FIG. 7). The dowel 124 is then replaced by the position stop pin 82 (see FIG. 8), to complete the actuator assembly 10.

When so assembled, the actuator assembly 10 is mounted to the shaft 14, which, in turn, is mounted to the casing 16.

From the foregoing it is to be appreciated that the improved actuator assembly 10 of the present invention can be assembled in an economical and highly reliable manner. The interaction between the precision positioning surfaces 98 and 100 of the counterbalance recess 94 with the corresponding precision positioning surfaces 114 and 116 of the bobbin 104, insures that the coil assembly 30 will be properly positioned with respect to the actuator 24. The particular construction of parts described above facilitates assembly line-type construction, and minimizes those surfaces having dimensions critical for proper assembly and/or operation of the actuator assembly 10.

Although a particular embodiment of the invention has been described in detail for purposes of illustration, various modifications may be made without departing from the spirit and scope of the invention. Accordingly, the invention is not to be limited, except as by the appended claims.

We claim:

1. A process for assembling a coil assembly to a pivotable actuator for use in a disk drive system, the steps comprising:
    providing an actuator having an arm assembly and a counterbalance, the counterbalance including a recess situated generally opposite the arm assembly with respect to a pivot axis of the actuator, the counterbalance recess including a dovetail receiving portion having at least two precision positioning surfaces;
    providing a coil assembly having a bobbin, the bobbin including a base, a core which extends from the base, and a dovetail extending from the base opposite the core, the dovetail being dimensioned to fit within the receiving portion of the counterbalance recess and including at least two precision positioning surfaces;

sliding the base and dovetail of the bobbin into the counterbalance recess;

applying a directional force to the coil assembly to cause the precision positioning surfaces of the bobbin dovetail to engage the corresponding precision positioning surfaces of the counterbalance recess; and fixing the coil assembly to the actuator with the precision positioning surfaces engaged, so that upon removal of the directional force applied to the coil assembly, the precision positioning surfaces remain engaged.

2. A process for assembling a coil assembly to a pivotable actuator as set forth in claim 1, wherein the counterbalance includes a dowel/pin alignment passageway extending through the counterbalance to the counterbalance recess generally parallel to the actuator pivot axis, and wherein the bobbin base includes a dowel/pin recess which is aligned with the dowel/pin alignment passageway when the coil assembly is correctly positioned within the counterbalance recess, and including the step of inserting a dowel through the alignment passageway to position an end thereof in the bobbin dowel/pin recess.

3. A process for assembling a coil assembly to a pivotable actuator as set forth in claim 2, wherein the step of fixing the coil assembly to the actuator includes the injection of an adhesive into the counterbalance recess between the actuator and the bobbin, wherein the precision positioning surfaces remain engaged throughout the injection of the adhesive such that none is injected therebetween.

4. A process for assembling a coil assembly to a pivotable actuator as set forth in claim 2, wherein the dowel is inserted through the alignment passageway into the dowel/pin recess while the directional force is applied to the coil assembly.

5. A process for assembling a coil assembly to a pivotable actuator as set forth in claim 3, including the step of removing the dowel from the dowel/pin recess and the alignment passageway after the coil assembly has been fixed to the actuator.

6. A process for assembling a coil assembly to a pivotable actuator as set forth in claim 5, including the step of replacing the dowel with a position stop pin inserted through the alignment passageway and into the dowel/pin recess.

7. A process for assembling a coil assembly to a pivotable actuator as set forth in claim 1, wherein the counterbalance recess dovetail receiving portion is dimensioned to permit sliding entry of the coil assembly without engaging the corresponding precision positioning surfaces of the counterbalance recess and the bobbin dovetail, until intended to do so through application of the directional force to the coil assembly.

8. A process for assembling a coil assembly to a pivotable actuator as set forth in claim 7, wherein the at least two precision positioning surfaces of the dovetail receiving portion include an upper planar surface extending generally the length of the counterbalance recess, and a lower planar surface spaced from the upper planar surface, the lower planar surface also extending generally the length of the counterbalance recess, wherein the upper and lower planar surfaces are inclined opposite to one another with respect to the actuator pivot axis and the direction of force applied to the coil assembly, wherein the upper and lower planar surfaces tend to centrally position the coil assembly within the counterbalance recess so that the bobbin core extends perpendicularly away from the pivot axis of the actuator.

9. A process for assembling a coil assembly to a pivotable actuator as set forth in claim 8, wherein the at least two precision positioning surfaces of the bobbin dovetail include two planar surfaces dimensioned to bear against the upper and lower planar surfaces of the dovetail receiving portion of the counterbalance recess, when the directional force is applied to the coil assembly.

10. A process for constructing an actuator assembly for a hard disk drive system, the steps comprising:

providing an actuator having an arm assembly and a counterbalance, the counterbalance including a recess situated generally opposite the arm assembly with respect to an actuator pivot axis, the counterbalance recess including a dovetail receiving portion having at least two precision positioning surfaces, the counterbalance further including a dowel/pin alignment passageway extending generally parallel to the actuator pivot axis;

providing a coil assembly having a bobbin, the bobbin including a base, a core which extends from the base, and a dovetail extending from the base opposite the core, the dovetail being dimensioned to fit within the receiving portion of the counterbalance recess and including at least two precision positioning surfaces, the bobbin further including a dowel/pin recess which can be aligned with the dowel/pin alignment passageway of the counterbalance;

sliding the bobbin base and dovetail into the counterbalance recess;

applying a directional force to the coil assembly generally perpendicular to the actuator pivot axis to cause the precision positioning surfaces of the bobbin dovetail to engage the precision positioning surfaces of the counterbalance recess;

placing a dowel through the alignment passageway to position and end thereof in the bobbin dowel/pin recess while the directional force is applied to the coil assembly;

fixing the coil assembly to the actuator with the precision positioning surfaces engaged, so that upon removal of the directional force applied to the coil assembly, the precision positioning surfaces remain engaged, the step of fixing the coil assembly including the injection of an adhesive into the counterbalance recess between the actuator and the bobbin, the precision positioning surfaces being engaged throughout the injection of the adhesive such that none is injected therebetween;

removing the dowel from the alignment passageway and the dowel/pin recess after the coil assembly has been fixed to the actuator; and replacing the dowel with a position stop pin inserted through the alignment passageway into the dowel/pin recess.

11. A process for constructing an actuator assembly as set forth in claim 10, including the steps of pivotally mounting the actuator to a shaft, and attaching the shaft to a hard disk drive housing.

12. An actuator assembly for a disk drive system, comprising:

an actuator pivotally mounted to a shaft and including an arm assembly and a counterbalance, the counterbalance including a recess situated generally opposite the arm assembly with respect to the longitudinal shaft axis, the counterbalance recess including a dovetail receiving portion having at least two precision positioning surfaces; and a coil assembly including a bobbin, the bobbin having a base, a core which extends from the base, and a dovetail extending from the base opposite the core, the dovetail being dimensioned to fit within the receiving portion of the counterbalance recess and including at least two precision positioning surfaces, wherein the coil assembly is placed within the counterbalance recess and is positioned by means of engagement between the corresponding precision positioning surfaces of the counterbalance recess and the bobbin dovetail.

13. An actuator assembly as set forth in claim 12, wherein the counterbalance includes a dowel/pin alignment passageway extending generally parallel to the shaft.

14. An actuator assembly as set forth in claim 13, including a position stop pin at least partially positioned within the dowel/pin alignment passageway.

15. An actuator assembly as set forth in claim 13, wherein the bobbin base includes a dowel/pin recess which is aligned with the dowel/pin alignment passageway of the counterbalance when the coil assembly is correctly positioned within the counterbalance recess.

16. An actuator assembly as set forth in claim 15, including a position stop pin having an end positioned within the dowel/pin recess of the bobbin, and which extends through the dowel/pin alignment passageway.

17. An actuator assembly as set forth in claim 16, wherein the arm assembly includes a plurality of head carriers for supporting head assemblies which interact with disks for storage and retrieval of information.

18. An actuator assembly as set forth in claim 17, including a stop plate for limiting movement of the position stop pin, thereby defining the full range of movement permitted the head assemblies.

19. An actuator assembly as set forth in claim 12, wherein the bobbin includes windings which extend peripherally around the bobbin core and through the bobbin base.

20. An actuator assembly as set forth in claim 12, including means for securing the coil assembly in place within the counterbalance recess.

21. An actuator assembly as set forth in claim 20, wherein the securing means includes an adhesive injected into any spacing between the bobbin base and dovetail, and the counterbalance recess, such that none is injected between the facing precision positioning surfaces of the counterbalance recess and the bobbin dovetail.

22. An actuator assembly as set forth in claim 12, wherein the counterbalance recess is dimensioned to permit assembly of the coil assembly to the actuator without engaging the corresponding precision positioning surfaces of the bobbin dovetail and the counterbalance recess, until intended to do so through application of a pulling force to the coil assembly away from the shaft.

23. An actuator assembly as set forth in claim 12, wherein the actuator includes a latch pin fixed to a latch pin arm which extends from the shaft between the arm assembly and the counterbalance, the latch pin being positioned to be locked by locking means of the disk drive system for immobilizing the actuator assembly.

* * * * *